(12) United States Patent
Kurihara et al.

(10) Patent No.: US 7,352,538 B2
(45) Date of Patent: Apr. 1, 2008

(54) MAGNETIC DISK DRIVE PIEZOELECTRIC ACTUATOR WITH HINGE PLATE LIMBS EXTENDING NON-LINEAR SYMMETRICALLY FROM CENTRAL PORTION

(75) Inventors: Kazuaki Kurihara, Kawasaki (JP); Masaharu Hida, Kawasaki (JP); Tsuyoshi Mita, Atsugi (JP)

(73) Assignee: Fujitsu Limited, Kawasaki (JP)

( * ) Notice: Subject to any disclaimer, the term of this patent is extended or adjusted under 35 U.S.C. 154(b) by 905 days.

(21) Appl. No.: 10/687,404

(22) Filed: Oct. 16, 2003

(65) Prior Publication Data

US 2004/0120081 A1 Jun. 24, 2004

Related U.S. Application Data

(63) Continuation of application No. PCT/JP01/03351, filed on Apr. 19, 2001.

(51) Int. Cl.
*G11B 5/56* (2006.01)
*H02N 2/12* (2006.01)

(52) U.S. Cl. .................... 360/294.4; 310/330

(58) Field of Classification Search ............ 360/294.4, 360/294, 294.1, 294.3; 310/330
See application file for complete search history.

(56) References Cited

U.S. PATENT DOCUMENTS

| 4,976,553 A | | 12/1990 | Yamaguchi et al. | |
| 5,764,444 A | * | 6/1998 | Imamura et al. | 360/294.4 |
| 6,233,124 B1 | * | 5/2001 | Budde et al. | 360/294.4 |
| 6,239,953 B1 | * | 5/2001 | Mei | 360/294.4 |
| 6,246,552 B1 | | 6/2001 | Soeno et al. | |
| 6,362,938 B1 | * | 3/2002 | Suzuki et al. | 360/294.4 |
| 2001/0040773 A1 | * | 11/2001 | Kurihara et al. | 360/294.4 |

FOREIGN PATENT DOCUMENTS

| EP | 1 058 238 | 12/2000 |
| JP | 3-10355 | 1/1991 |
| JP | 7-136888 | 5/1995 |
| JP | 8-255323 | 10/1996 |
| JP | 11-053854 | 2/1999 |
| JP | 2000-298239 | 10/2000 |
| JP | 2000-348451 | 12/2000 |
| WO | WO 98/19304 | 5/1998 |

* cited by examiner

*Primary Examiner*—Craig A. Renner
(74) *Attorney, Agent, or Firm*—Greer, Burns & Crain, Ltd.

(57) ABSTRACT

The present invention has an object to provide a small, light-weight, impact-resistant, high-accuracy, and low-cost piezoelectric actuator which can achieve a large displacement at a low drive voltage as well as an information storage device which incorporates the piezoelectric actuator and has high recording density. The piezoelectric actuator according to the present invention is equipped with a hinge plate 220 which has a central portion 221, two lateral portions 222 extending point-symmetrically from both ends of the central portion 221, and two limbs 223 extending point-symmetrically and non-linear symmetrically from both ends of the central portion 221 as well as with a piezoelectric element 210 which brings the two limbs 223 toward and away from each other.

9 Claims, 13 Drawing Sheets

MAGNETIC DISK DRIVE PIEZOELECTRIC ACTUATOR WITH HINGE PLATE LIMBS EXTENDING NON-LINEAR SYMMETRICALLY FROM CENTRAL PORTION

This is a continuation of International PCT Application No. PCT/JP01/03351, filed Apr. 19, 2001.

TECHNICAL FIELD

The present invention relates to a piezoelectric actuator and an information storage device which uses the same.

BACKGROUND ART

Conventionally, an information storage device is incorporated in, or connected to, electronics devices such as personal computers and word processors to store information. A hard disk drive is known as a type of information storage device. The hard disk drive is generally equipped with a disk serving as an information storage medium, a head which reads and writes recording bits from/to the disk, an arm which brings the head close to the disk and holds it, and an electromagnetic actuator which moves the head over the disk by driving the arm.

The recording densities of hard disk drives have been increasing with advances in personal computers and the like and have increased dramatically in recent years with increases in demand for personal computers and the like to handle images and music. With the increasing recording densities of hard disk drives, recording bits on the disks are becoming finer, the rotational speeds of the disks are becoming faster, and higher positioning accuracy and speed are required of the heads. Also, hard disk drives are achieving reductions in size, weight, and power consumption.

To deal with this situation, a hard disk drive has been proposed which is equipped with a piezoelectric actuator on the arm independent of the conventional electromagnetic actuator in order to position the head accurately at high speed.

However, piezoelectric actuators and hard disk drives proposed conventionally have such problems as insufficient head displacement, high drive voltage, large size and heavy weight, low impact resistance, and complex structure as well as high manufacturing cost required to achieve high accuracy.

These problems are not unique to hard disk drives and they are generally encountered by information storage devices designed to move the head by holding it with an arm.

DISCLOSURE OF THE INVENTION

In view of the above circumstances, the present invention has an object to provide a small, light-weight, impact-resistant, high-accuracy, and low-cost piezoelectric actuator which can achieve a large displacement at a low drive voltage as well as an information storage device which incorporates the piezoelectric actuator and has high recording density.

To achieve the above object, the present invention provides a piezoelectric actuator, equipped with:

a hinge plate which has a central portion, two lateral portions, and two limbs, the central portion having both ends and being allowed to be divided between both the ends, the two lateral portions extending point-symmetrically from both ends of the central portion, and the two limbs extending point-symmetrically and non-linear symmetrically from both ends of the central portion and being capable of rotating toward and away from the lateral portions; and a piezoelectric element to which the two limbs of the hinge plate are attached firmly and which brings the two limbs toward and away from each other when it expands or contracts by application and removal of voltage.

The piezoelectric actuator of the present invention has a simple structure composed of the hinge plate and piezoelectric element. Since the hinge plate can be produced easily with high accuracy by stamping or the like, a small, light-weight, impact-resistant, and high-accuracy piezoelectric actuator can be implemented at low cost. Also, as the piezoelectric element described above, the piezoelectric actuator according to the present invention can use a piezoelectric element which has a length comparable to the overall length of the piezoelectric actuator and has a laminated structure with sufficiently large number of layers. This makes it possible to operate the piezoelectric actuator at a low drive voltage. Furthermore, since the piezoelectric element can rotatably drive the lateral portions of the hinge plate greatly around the central portion by moving the limbs of the hinge plate toward and away from each, the piezoelectric actuator of the present invention can produce large displacements.

In the piezoelectric actuator of the present invention, the piezoelectric element may be based on longitudinal piezoelectric effects (33 mode), expanding when a voltage is applied and contracting when no voltage is applied, or it may be based on transverse piezoelectric effects (31 mode), contracting when a voltage is applied and expanding when no voltage is applied. To obtain a larger amount of driving, preferably the piezoelectric actuator of the present invention employs the piezoelectric element which expands when a voltage is applied and contracts when no voltage is applied due to the longitudinal piezoelectric effects (33 mode).

Available piezoelectric materials for the piezoelectric element include PZT-based, PT-based, barium titanate-based, and layered perovskite-based piezoelectric materials. The piezoelectric materials may be either so-called hard-type piezoelectric materials such as pure lead zirconate titanate (PZT) or so-called soft-type piezoelectric materials such as PZT-based piezoelectric ceramic made up of lead zirconate titanate and additives. The PZT-based piezoelectric ceramic, which is inexpensive and has a large piezoelectric constant, is suitable as piezoelectric material for the piezoelectric element. PNN-PT-PZ-based piezoelectric material, in particular, has the highest piezoelectric constant among PZT-based piezoelectric materials and has high sinterability, and thus it is particularly suitable as piezoelectric material for the piezoelectric element.

Regarding materials for the hinge plate, metal materials such as so-called stainless steel (iron-nickel-chromium alloys), aluminum alloys, and copper alloys are preferable, but composite materials such as FRP (Fiber Reforced Plustic) may also be used. Also, the hinge plate may be a laminated plate made by laminating these materials.

To achieve the above object, the present invention provides an information storage device, equipped with:

a head section carrying a head which executes at least one of information recording and information reproduction on/from a predetermined information storage medium;

an arm section which holds the head section in order for the head mounted on the head section to approach or contact the information storage medium;

an arm actuator which drives the arm section to move the head mounted on the head section held by the arm section over the information storage medium; and a head actuator which rotates the head section with respect to the arm section, wherein the head actuator has the hinge plate and the piezoelectric element.

The head may be a magnetic head or optical head.

The present invention can implement an information storage device with high recording density because the head section is driven by the head actuator with high accuracy.

In the information storage device of the present invention, preferably the head actuator rotates the head section around the center of gravity of the head section.

Rotating the head section around its center of gravity by the head actuator makes it possible to reduce the moment of inertia of the driven head and control the head position with high accuracy. However, if it is desirable to increase the amount of displacement by sacrificing the accuracy of head position to some extent, it is acceptable to rotate the head section around a point away from its center of gravity.

In the information storage device of the present invention, the head section may be composed of the head and a slider which slides over the information storage medium carrying the head, the arm section may be composed of an arm driven by the arm actuator and a suspension connected to the arm, and the head actuator may be installed between the suspension and slider.

Alternatively, in the information storage device of the present invention, the head section may be composed of the head, a slider which slides over the information storage medium carrying the head, and a suspension which holds the slider while the head actuator may be installed between the suspension and the slider in the arm section.

Also, in the information storage device of the present invention, preferably the hinge plate is formed integrally with at least the arm section or the head section. Such an information storage device involves a smaller number of assembly processes, making it possible to implement a high-accuracy information storage device at low cost.

BEST MODE FOR CARRYING OUT THE INVENTION

Now, description will be given of embodiments of the information storage device according to the present invention which incorporate embodiments of the piezoelectric actuator according to the present invention.

First, description will be given of an overall structure common to these embodiments of the information storage device.

Figure 1:
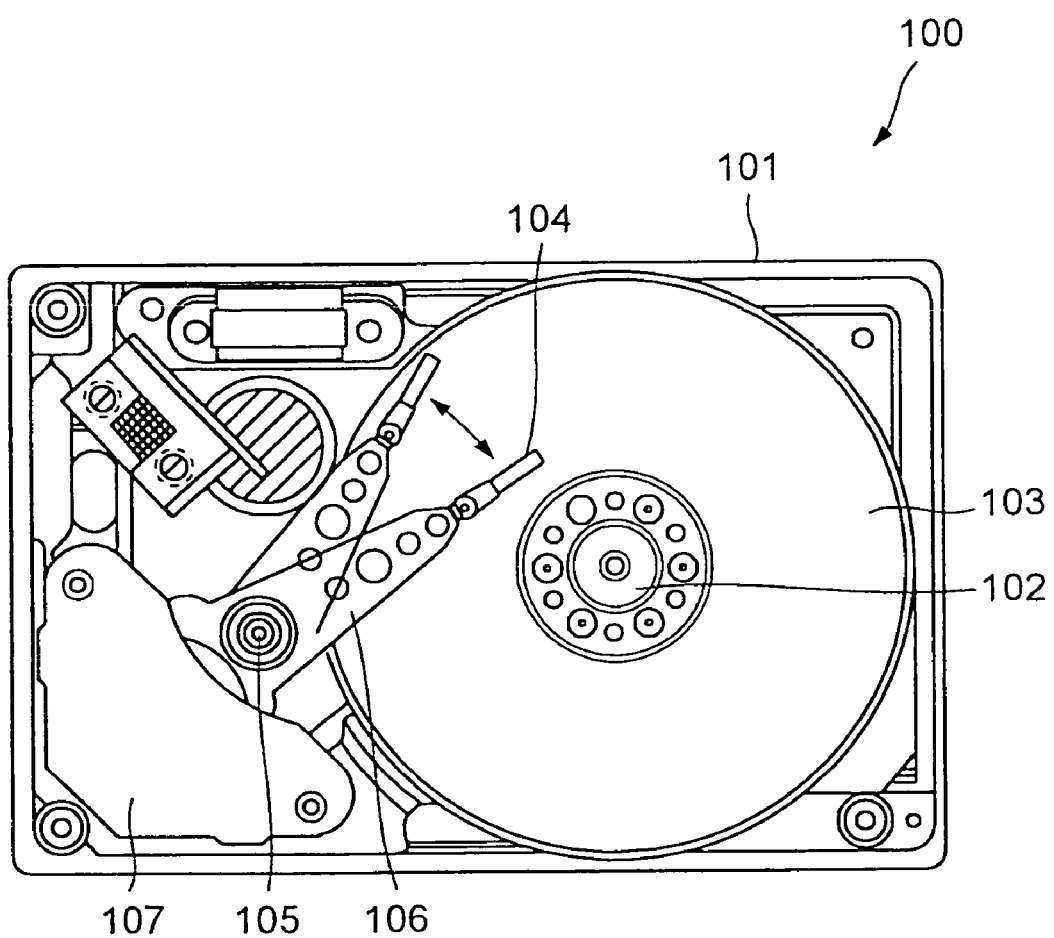
FIG. 1 is a diagram showing a structure common to embodiments of an information storage device according to the present invention.

FIG. 1 is a diagram showing the structure common to the embodiments of the information storage device according to the present invention.

A hard disk drive (HDD) 100 shown in FIG. 1 is an example of the information storage device according to the present invention. A housing 101 of the hard disk drive 100 contains a magnetic disk 103 which is fitted over a rotating shaft 102 and rotates, a head section 104 carrying a magnetic head which records and reproduces information on/from the magnetic disk 103, an arm section 106 which holds the head section 104 via a head actuator (not shown) and moves around an arm shaft 105 and along a surface of the magnetic disk 103, and an arm actuator 107 which drives the arm section 106. The head actuator is an example of the piezoelectric actuator according to the present invention. Being divided by the head actuator, the head section 104 is on the side of the head and the arm section 106 is on the side of the arm shaft 105.

To record information on the magnetic disk 103 or reproduce information stored on the magnetic disk 103, the arm section 106 is driven by the arm actuator 107 constituted of a magnetic circuit, the head section 104 is driven by the head actuator, and consequently the magnetic head is positioned on the desired track on the rotating magnetic disk 103. The magnetic head mounted on the head section 104 comes close to minute areas on the tracks of the magnetic disk 103 in sequence as the magnetic disk 103 rotates.

To record information, electrical recording signals are input in the magnetic head thus positioned, the magnetic head applies a magnetic field to each minute area according to the recording signals, and information carried by the recording signals are recorded as magnetization directions of the minute areas.

To reproduce information, the information recorded as the magnetization directions of the minute areas are picked up by the magnetic head as reproduced electrical signals in accordance with the magnetic fields generated by the magnetizations.

Inner space of the housing 101 shown in FIG. 1 is closed by a cover (not shown).

Features of the different embodiments of the information storage device which share the common overall structure described above depend on the structure of the head actuator and its surroundings installed at the tip of the arm section 106. Thus, the embodiments of the information storage device will be described below only in relation to the structure of the head actuator and its surroundings.

Figure 2:
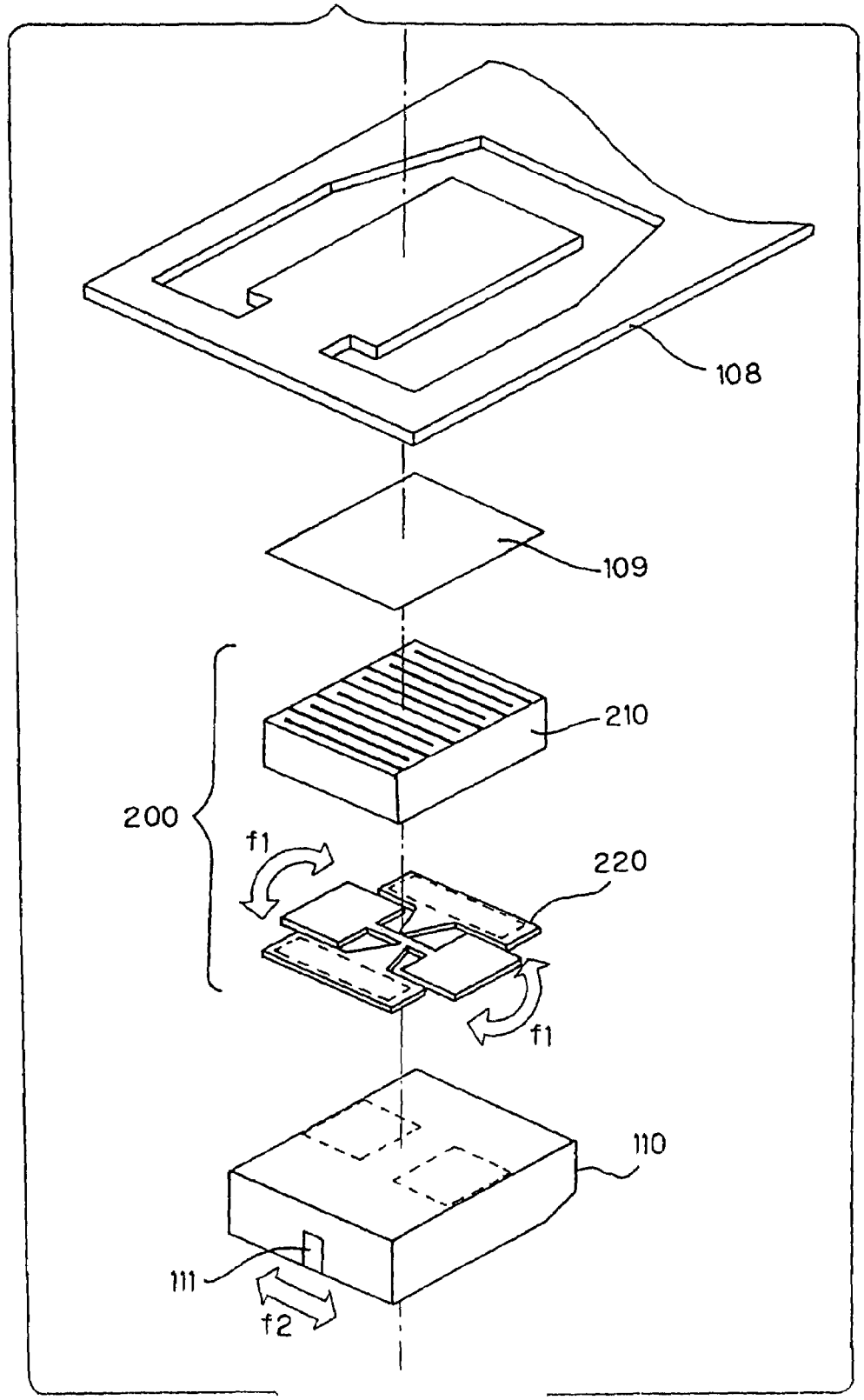
FIG. 2 is an exploded perspective view showing a head actuator and its surroundings in a first embodiment of the information storage device according to the present invention.

FIG. 2 is an exploded perspective view showing a head actuator and its surroundings in a first embodiment of the information storage device according to the present invention.

In the first embodiment of the information storage device according to the present invention, the tip of the arm section is constituted of a suspension 108. The suspension 108 functions as a plate spring which bends towards and away from the magnetic disk (in the vertical direction in FIG. 2).

A head actuator 200 composed of a piezoelectric element 210 and hinge plate 220 is bonded to the suspension 108 by means of a bonding layer 109. The head actuator 200 shown in FIG. 2 is a first embodiment of the piezoelectric actuator according to the present invention.

A slider 110 which carries a head 111 is bonded to the hinge plate 220 of the head actuator 200. In the first embodiment of the information storage device according to the present invention, the slider 110 corresponds to the head section.

The head actuator 200 rotatably drives part of the hinge plate 220 in the direction indicated by arrow f1 based on a principle described later. Consequently, the slider 110 is driven rotatably, displacing the head 111 in the direction indicated by arrow f2.

According to the embodiment shown in FIG. 2, the head actuator 200 and slider 110 are bonded in such a way as to make the center of rotation of the rotational driving by the head actuator 200 coincide with the center of gravity of the slider 110. This reduces the moment of inertia of the head being driven.

The head actuator 200 will be described in detail below.

Figure 3:
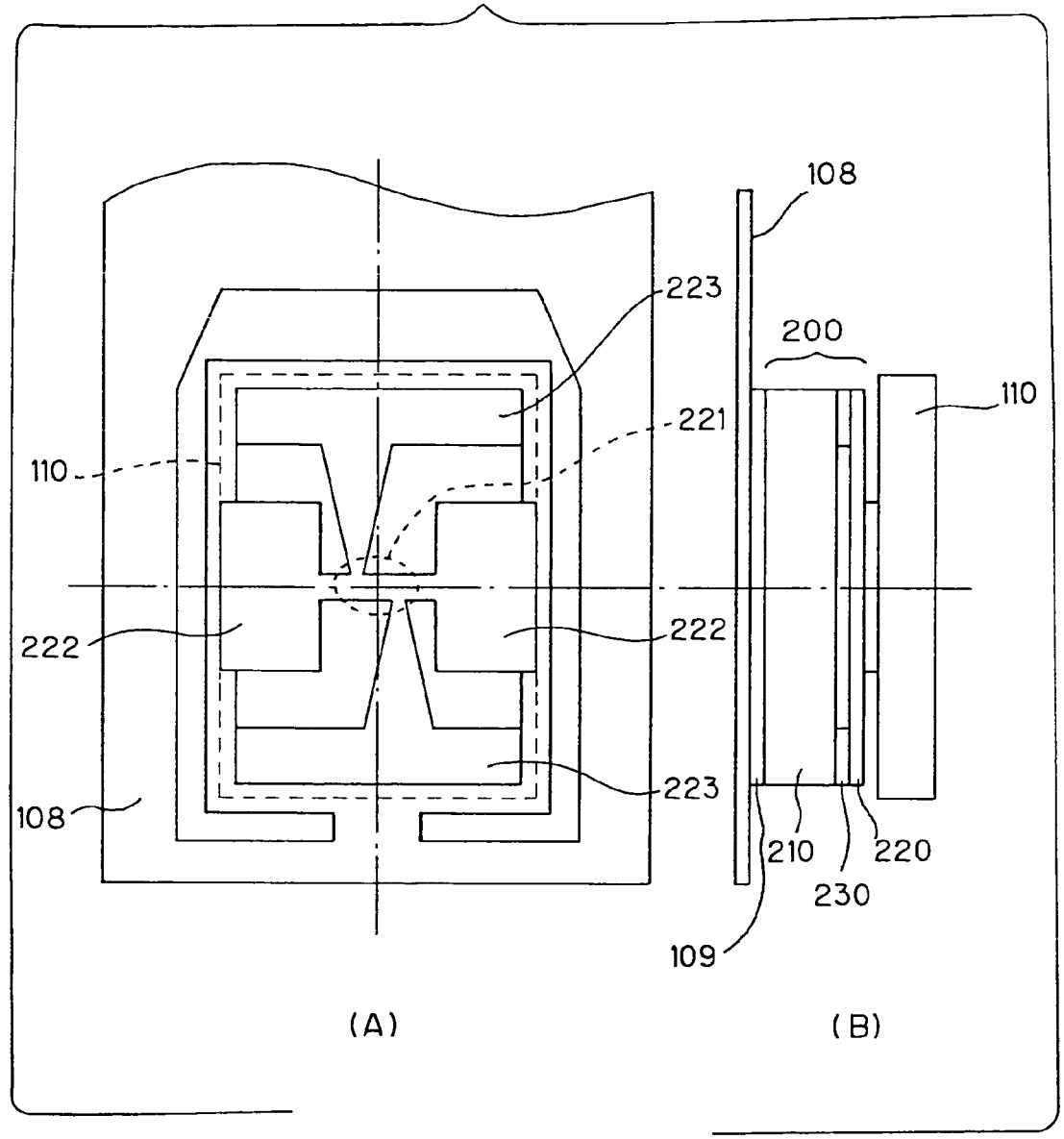
FIG. 3 is a two-view drawing showing the head actuator and its surroundings.
Figure 4:
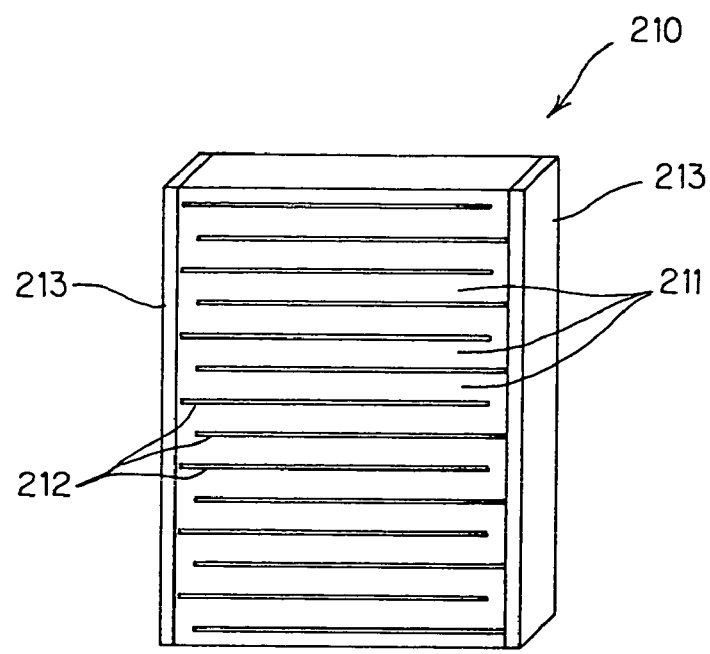
FIG. 4 is a diagram showing a piezoelectric element of the head actuator.
Figure 5:
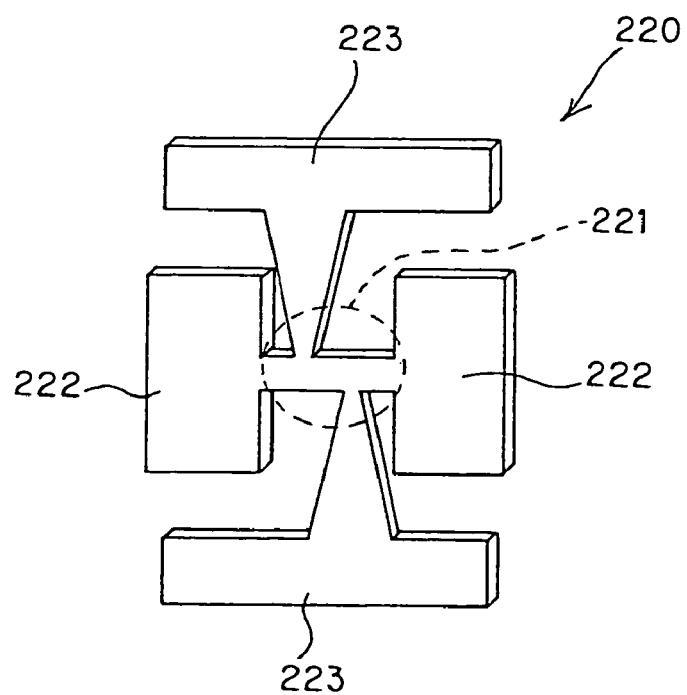
FIG. 5 is a diagram showing a hinge plate of the head actuator.

FIG. 3 is a two-view drawing showing the head actuator and its surroundings, FIG. 4 is a diagram showing the piezoelectric element of the head actuator, and FIG. 5 is a diagram showing the hinge plate of the head actuator. Part (a) of FIG. 3 is a front view of the head actuator and its surroundings and part (b) of FIG. 3 is a side view of the head actuator and its surroundings.

The piezoelectric element 210 shown in FIG. 4 has a multilayered structure composed of piezoelectric layers 211 and electrode layers 212 and has a simple rectangular outline. The piezoelectric element 210 of such a structure and outline has high manufacturability and can be manufactured at low cost using known technology such as a green sheet method. Preferably the electrode material of the electrode layers 212 can be baked integrally with piezoelectric material. Available materials include, for example, metal materials such as Pt, Ag—Pd, Ni, and Au and electrically conductive ceramic. Of the electrode layers 212, those at the same potential can be interconnected easily at low cost as electrodes 213 are formed on the flanks of the piezoelectric element 210. Preferably the electrodes 213 on the flanks are produced by electroless plating using Ni, Cr, Au, or the like, but it is also possible to use thin-film technology such as vapor deposition, sputtering, ion plating, or CVD, thermal spray technology, or thick-film technology.

The piezoelectric element 210 shown in FIG. 4 expands by the longitudinal piezoelectric effects (so-called 33 mode). When a drive voltage is applied between the two electrodes 213 on the two flanks, it is applied to the piezoelectric layers 211, expanding the piezoelectric element 210 in the vertical direction in FIG. 4. When the applied voltage is removed, the piezoelectric element 210 contracts back to its original state.

The hinge plate 220 shown in FIGS. 3 and 5 has a central portion 221, two lateral portions 222, and two limbs 223. The two lateral portions 222 extend in opposite directions on both sides of the central portion 221, with the central portion 221 and two lateral portions 222 forming a rigid body. The two limbs 223 extend point-symmetrically in the direction orthogonal to the rigid body. The two limbs 223 are capable of bending toward and away from the lateral portions 222 at the points where they are linked to the central portion 221. The hinge plate 220 with such a structure can be produced at low cost by stamping or etching a metal plate.

As shown in part (b) of FIG. 3, the piezoelectric element 210 and hinge plate 220 are attached together firmly, with the limbs 223 of the hinge plate 220 bonded by an adhesive 230, to form the head actuator 200.

The head actuator 200 and the piezoelectric element 210 shown in FIG. 3 are approximately the same size as the slider 110. This size is sufficiently small for the head actuator 200, and sufficiently large for the piezoelectric element 210. The head actuator 200 is a small and powerful actuator. Besides, by using a highly rigid material such as a stainless steel plate for the hinge plate 220, it is possible to implement a head actuator 200 of a high resonance frequency.

The piezoelectric element 210 of the head actuator 200 is bonded to the suspension 108 via the bonding layer 109. The bonding layer 109, which is made of an adhesive of low rigidity, can expand and contract easily. Although the piezoelectric element 210 is made of brittle piezoelectric material, it forms an impact-resistant structure when bonded to the suspension 108 over a wide area. Also, this bonding prevents fragments from scattering if the piezoelectric element 210 should be broken, and thus prevents damage to the surface of the recording medium.

The two lateral portions 222 of the hinge plate 220 of the head actuator 200 are both attached firmly to the slider 110.

With the structure shown in FIGS. 2 and 3, bonding strength can be secured easily because it is possible to sufficiently increase the bonding areas between the suspension 108 and piezoelectric element 210, between the piezoelectric element 210 and limbs 223, and between the lateral portions 222 and slider 110.

Also, since the structure shown in FIGS. 2 and 3 is made by laminating and bonding flat parts such as the suspension 108 and piezoelectric element 210, it is easy to ensure high parallelism and positional accuracy between the parts.

Also, with the structure shown in FIGS. 2 and 3, exposed surfaces of the electrode layers 212 of the piezoelectric element 210 can be coated with resin or the like to improve moisture resistance, and thereby prevent metal from the electrode layers 212 from diffusing into the piezoelectric layers 211. This makes it possible to obtain a reliable long-life product.

Incidentally, the gap between the limbs 223 and lateral portions 222 of the hinge plate 220 in the head actuator 200 may be filled with low-rigidity resin. Also, it is possible to cover the entire head actuator 200 with low-rigidity resin.

By filling or covering with low-rigidity resin in this way, it is possible to prevent damage to the hinge plate 220.

Now, a drive principle of the piezoelectric actuator according to the present invention will be described by taking the structure shown in FIGS. 2 and 3 as an example.

Figure 6:
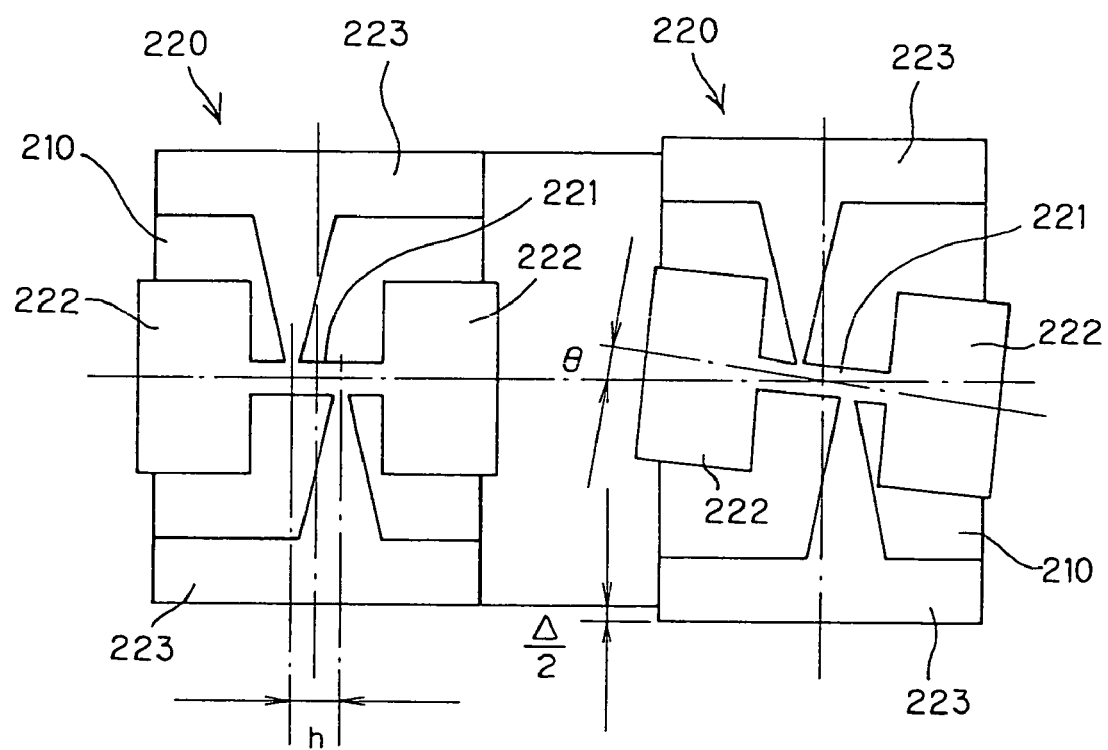
FIG. 6 is an explanatory diagram illustrating a drive principle of a piezoelectric actuator according to the present invention.

FIG. 6 is an explanatory diagram illustrating the drive principle of the piezoelectric actuator according to the present invention. When the piezoelectric element 210 of the head actuator 200 expands by a certain amount of expansion Δ, the two limbs 223 of the hinge plate 220 are each displaced by half the amount of expansion Δ with respect to the center of the hinge plate 220. If the limbs 223 are apart from each other by a distance of h on the central portion 221, the rotation angle of the rigid body composed of the central portion 221 and lateral portions 222 is given by $$\theta = \tan^{-1}(\Delta/h) \leq \Delta/h$$

Thus, the amount of displacement δ of the head 111 fastened to the tip of the slider 110 shown in FIG. 2 is given by the following equation using the length L of the slider 110.

$$\delta = (L/2) \times \sin\theta \leq (L/2) \times \Delta/h = L\Delta/2h$$

Also, if the piezoelectric constant is d, length of the piezoelectric element is k, layer thickness of the piezoelectric layers is t, and drive voltage is V, then the amount of expansion Δ of the piezoelectric element is given by $$\Delta = dVk/t$$

Thus, the amount of displacement δ of the head 111 is given by $$\delta = LdVk/2ht$$

Suppose, for example, d=500 [pm/V], t=20[μm], k=1 [mm], V=12 [V], h=0.1 [mm], and L=0.85 [mm], then δ=1.3 [μm]. Thus, it can be seen that a drive voltage of 12 V gives displacement in excess of 1 μm. Since the arm actuator 107 shown in FIG. 1 can be implemented at low cost if its accuracy is on the order of 1 μm, a low-cost information storage device can be implemented using a head actuator with a head displacement δ in excess of 1 μm.

Other embodiments of the present invention will be described below.

Figure 7:
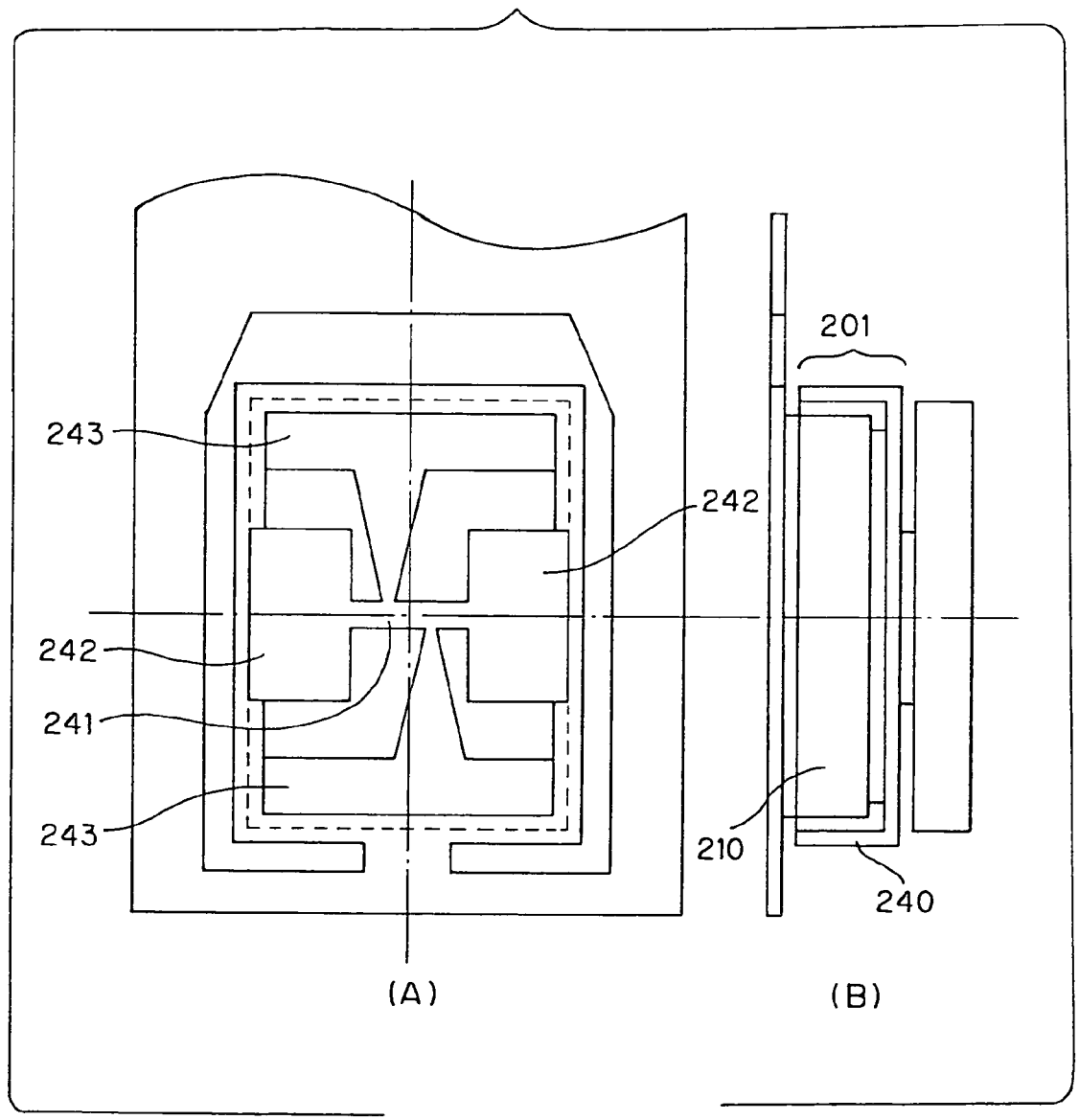
FIG. 7 is a two-view drawing showing a head actuator and its surroundings in a second embodiment of the information storage device according to the present invention.

FIG. 7 is a two-view drawing showing a head actuator and its surroundings in a second embodiment of the information storage device according to the present invention.

The second embodiment of the information storage device according to the present invention is the same as the above-described first embodiment of the information storage device except that it incorporates a second embodiment of the piezoelectric actuator according to the present invention instead of the first embodiment of the piezoelectric actuator according to the present invention.

Part (a) of FIG. 7 is a front view of the head actuator and its surroundings and part (b) of FIG. 7 is a side view of the head actuator and its surroundings.

The head actuator 201 shown in FIG. 7 has the same piezoelectric element 210 as the one described above and a hinge plate 240 different from the one described above. The head actuator 201 corresponds to the second embodiment of the piezoelectric actuator according to the present invention.

The hinge plate 240 of the head actuator 201 also has a central portion 241, two lateral portions 242, and two limbs 243, but the limbs 243 of the hinge plate 240 are bent toward the piezoelectric element 210 and attached firmly to the ends of the piezoelectric element 210.

Whereas with the head actuator 200 shown in FIG. 3, etc., the limbs 223 attached firmly to the piezoelectric element 210 partially restrict the expansion and contraction of the piezoelectric element 210, the head actuator 201 shown in FIG. 7 allows the piezoelectric element 210 to expand and contract freely, and thus makes full use of the expansion and contraction capabilities of the piezoelectric element 210.

Figure 8:
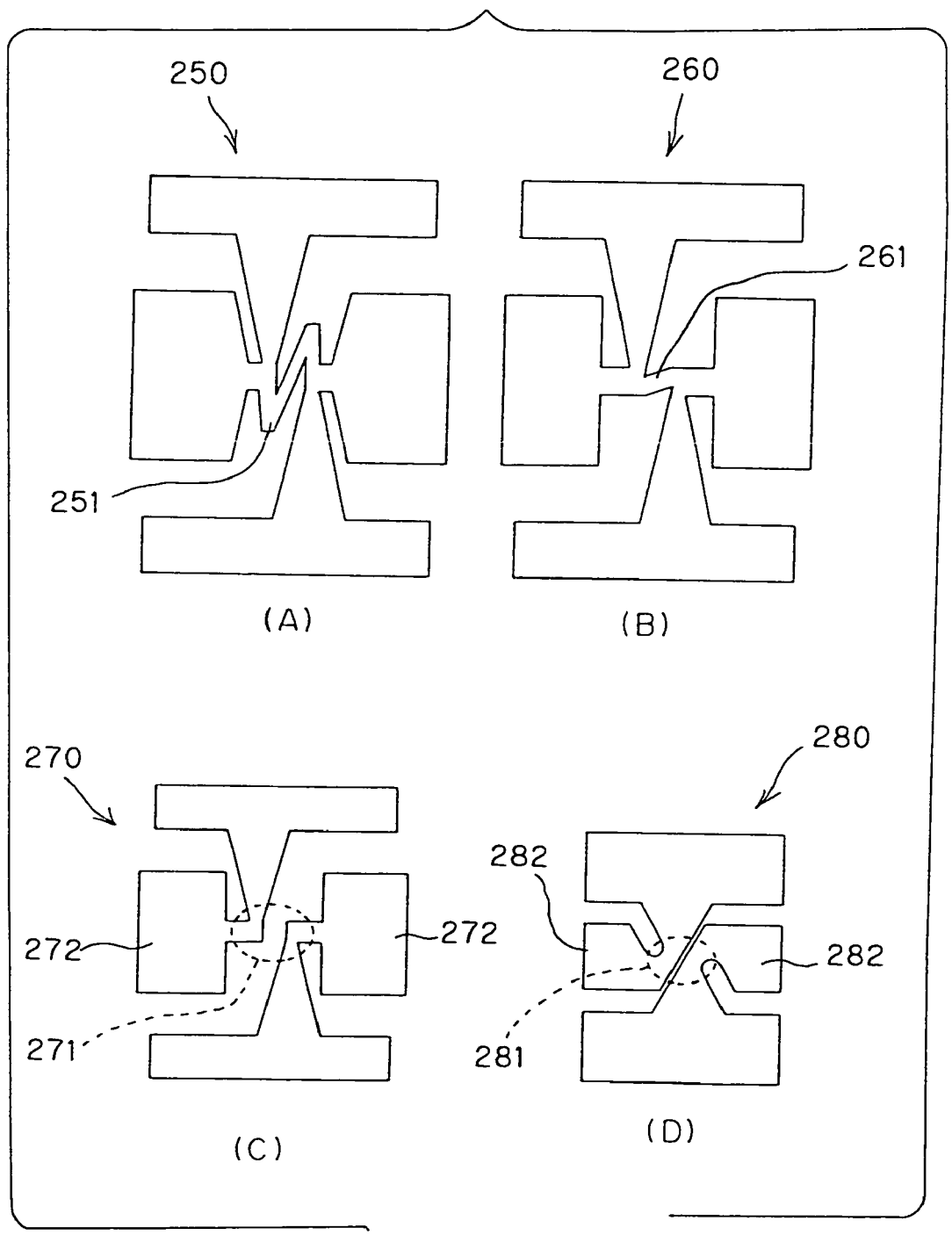
FIG. 8 is a diagram showing variations of a hinge plate according to the present invention.

FIG. 8 is a diagram showing variations of the hinge plate according to the present invention.

The hinge plate according to the present invention has various possible variations such as those described later. Any of the hinge plates may be used for the piezoelectric actuator according to the present invention and the head actuator of the information storage device according to the present invention.

Parts (a) and (b) of FIG. 8 illustrate hinge plates 250 and 260 which have N-shaped central portions 251 and 261, respectively. The drive principle described with reference to FIG. 6 does not depend on the shape of the central portion, and thus, any shape of hinge plate may be used.

Also, parts (c) and (d) of FIG. 8 illustrate hinge plates 270 and 280 which have respective central portions 271 and 281 divided in two. Even if the hinge plate 270 or 280 has the bisected central portions 271 or 281, if two lateral portions 272 or 282 are firmly attached to a common driven object (e.g., slider), the driven object, lateral portions, and central portions will form an integral rigid body, and thus, the driven object is rotatably driven according to the drive principle described with reference to FIG. 6.

Furthermore, the lateral portions and limbs of the hinge plate according to the present invention may be of any shape as long as the two lateral portions extend point-symmetrically and the two limbs extend point-symmetrically and non-linear symmetrically. The lateral portions may be configured to extend point-symmetrically and linear-symmetrically, for example, as shown in parts (a) to (c) of FIG. 8 or point-symmetrically and non-linear symmetrically such as the two lateral portions 282 shown in part (d) of FIG. 8. The limbs may extend orthogonally to the lateral portions, for example, as illustrated in FIG. 8 or at oblique angles to the lateral portions.

Figure 9:
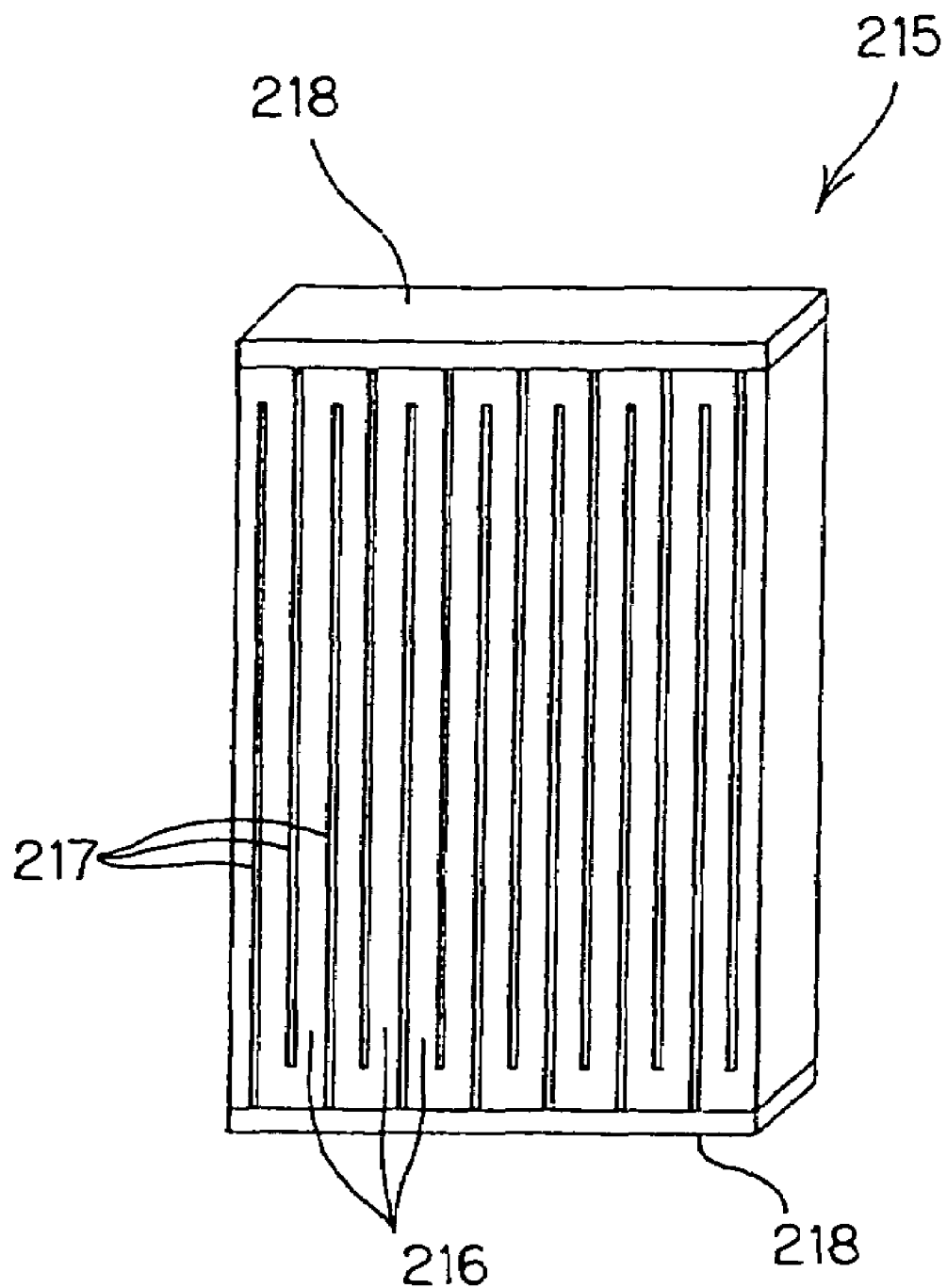
FIG. 9 is a diagram showing another example of the piezoelectric element according to the present invention.

FIG. 9 is a diagram showing another example of the piezoelectric element according to the present invention.

The direction of lamination of piezoelectric layers 216 and electrode layers 217 in the piezoelectric element 215 shown in FIG. 9 is orthogonal to that of the piezoelectric element 210 shown in FIG. 4. The piezoelectric element 215 shown in FIG. 9 expands and contracts by the transverse piezoelectric effects (so-called 31 mode): when a drive voltage is applied between two electrodes 218 on the two ends, it is applied to the piezoelectric layers 216 for contracting in the vertical direction in FIG. 9. When the applied voltage is removed, the piezoelectric element 215 contracts back to its original state. The amount of expansion/contraction of the piezoelectric element 215 shown in FIG. 9 is sufficiently practical although it is not as large as that of the piezoelectric element 210 shown in FIG. 4 at the same voltage. Incidentally, a direction of lamination orthogonal to both the direction of lamination of the piezoelectric element 210 shown in FIG. 4 and the direction of lamination of the piezoelectric element 215 shown in FIG. 9 is conceivable in principle, but this is not practical because both the number of laminations and amount of expansion/contraction are far smaller than those of the piezoelectric elements 210 and 215 shown in FIGS. 4 and 9.

The piezoelectric element 215 shown in FIG. 9, when combined with the various hinge plates 220 to 280 described above, provides variations of the piezoelectric actuator according to the present invention.

Figure 10:
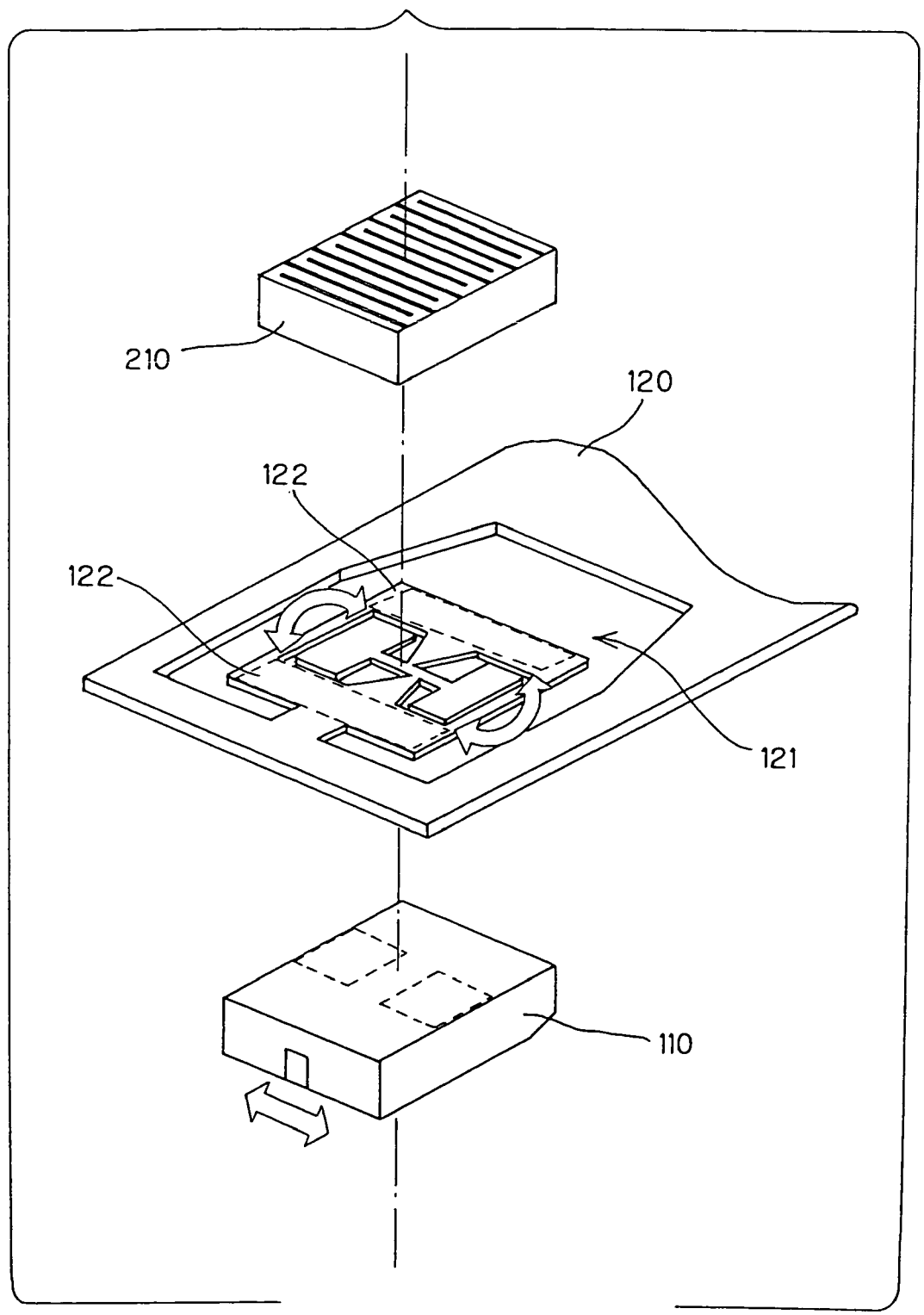
FIG. 10 is an exploded perspective view showing a head actuator and its surroundings in a third embodiment of the information storage device according to the present invention.

FIG. 10 is an exploded perspective view showing a head actuator and its surroundings in a third embodiment of the information storage device according to the present invention.

In the third embodiment of the information storage device according to the present invention, a hinge plate 121 is incorporated in a suspension 120. The hinge plate 121 shown in FIG. 10 is an example of a hinge plate formed integrally with an arm section.

To obtain a structure similar to the one shown in FIGS. 2 and 3, a piezoelectric element 210 is attached firmly to the topside of the hinge plate 121 shown in FIG. 10 and a slider 110 is attached firmly to the underside of the hinge plate.

The embodiment according to which the hinge plate 121 is incorporated in the suspension 120 in this way involves a smaller number of bonding processes during assembly of the structure around the tip of the arm section than the embodiment shown in FIGS. 2 and 3. This reduces errors in bonding parts and makes it possible to implement a high-accuracy information storage device at low cost.

Figure 11:
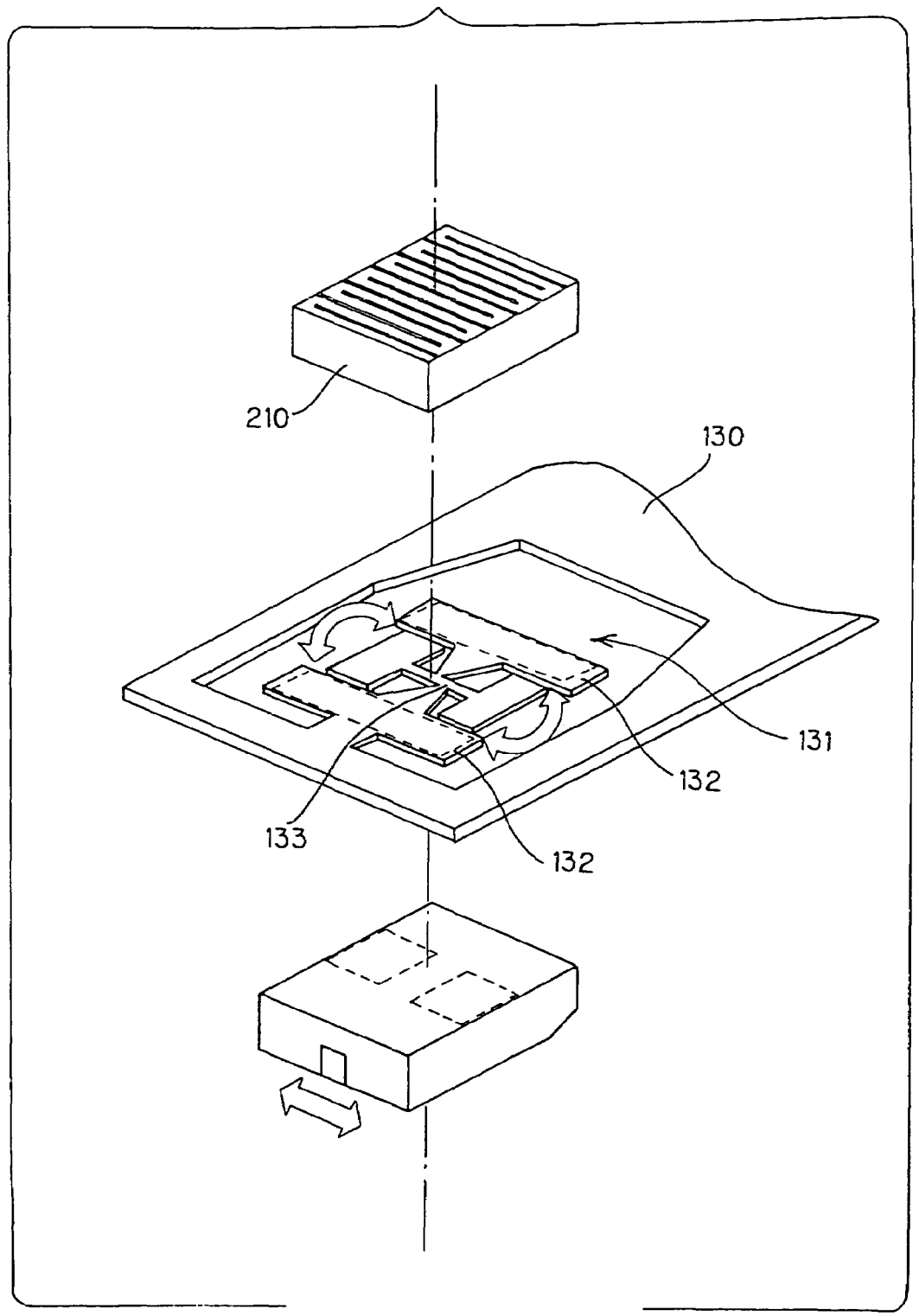
FIG. 11 is an exploded perspective view showing a head actuator and its surroundings in a fourth embodiment of the information storage device according to the present invention.

FIG. 11 is an exploded perspective view showing a head actuator and its surroundings in a fourth embodiment of the information storage device according to the present invention.

In fourth embodiment of the information storage device according to the present invention, again a hinge plate 131 is incorporated in a suspension 130. However, whereas in the hinge plate 121 shown in FIG. 10, two limbs 122 are linked with each other directly, in the hinge plate 131 shown in FIG. 11, two limbs 132 are linked only via a central portion 133. The structure of the hinge plate 131 shown in FIG. 11 is advantageous over the structure of the hinge plate 121 shown in FIG. 10 in that it does not obstruct expansion and contraction of the piezoelectric element 210 bonded to the hinge plate 131, but the hinge plate 131 shown in FIG. 11 is at a disadvantage compared to the hinge plate 121 shown in FIG. 10 in that one of the limbs 131 may come off during manufacturing.

Figure 12:
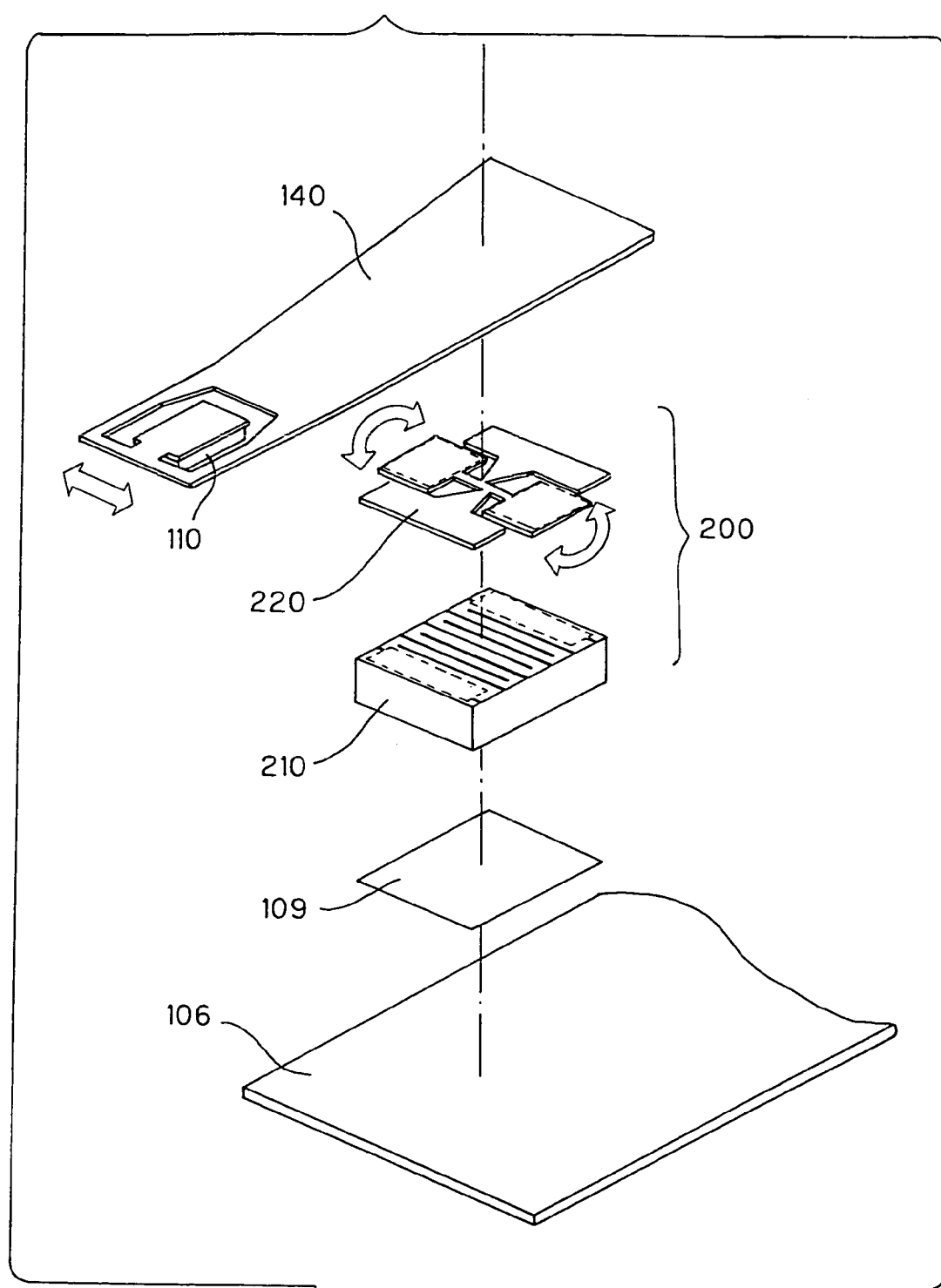
FIG. 12 is an exploded perspective view showing a head actuator and its surroundings in a fifth embodiment of the information storage device according to the present invention.

FIG. 12 is an exploded perspective view showing a head actuator and its surroundings in a fifth embodiment of the information storage device according to the present invention.

In the fifth embodiment of the information storage device according to the present invention, a suspension 140 is installed as part of the head section and a slider 110 is fastened to the tip of the suspension 140. The fifth embodiment is equipped with the head actuator 200 composed of the piezoelectric element 210 and hinge plate 220 as is the case with the above embodiments. The head actuator 200 drives the head section including the suspension 140. The head actuator 200 is bonded to the arm section 106 of the rigid body via the bonding layer 109.

According to the fifth embodiment, the displacement produced by the head actuator 200 is magnified by the long suspension, which results in a fairly large displacement of the head mounted on the slider 110.

Figure 13:
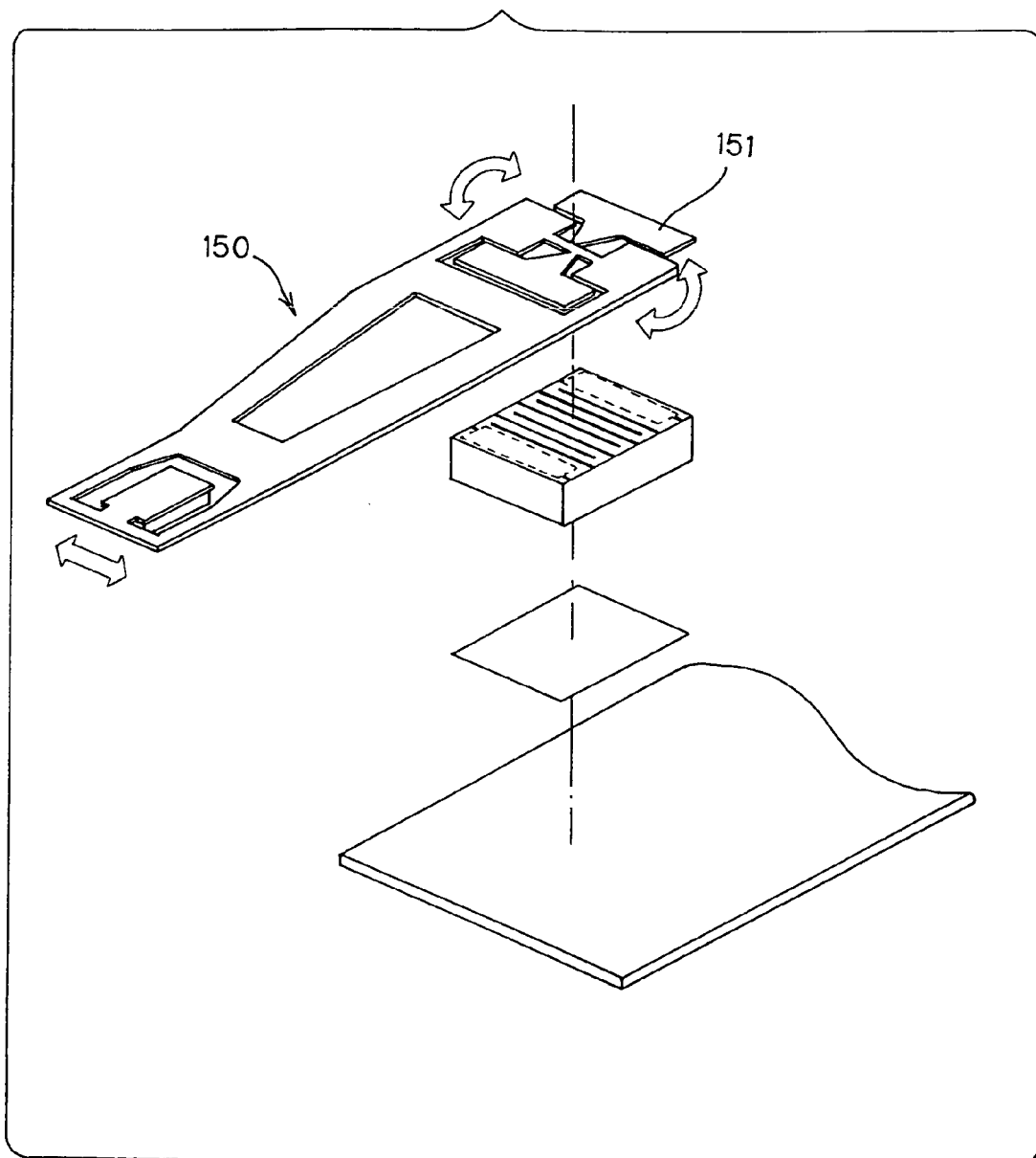
FIG. 13 is an exploded perspective view showing a head actuator and its surroundings in a sixth embodiment of the information storage device according to the present invention.

FIG. 13 is an exploded perspective view showing a head actuator and its surroundings in a sixth embodiment of the information storage device according to the present invention.

The sixth embodiment of the information storage device according to the present invention is the same as the fifth embodiment of the information storage device except that a suspension 150 incorporates a hinge plate 151.

The hinge plate 151 according to the sixth embodiment is an example of a hinge plate formed integrally with a head section. The structure of the sixth embodiment involves a small number of bonding processes as is the case with the third embodiment shown in FIG. 10. This reduces errors in bonding parts and makes it possible to implement a high-accuracy information storage device at low cost.

Figure 14:
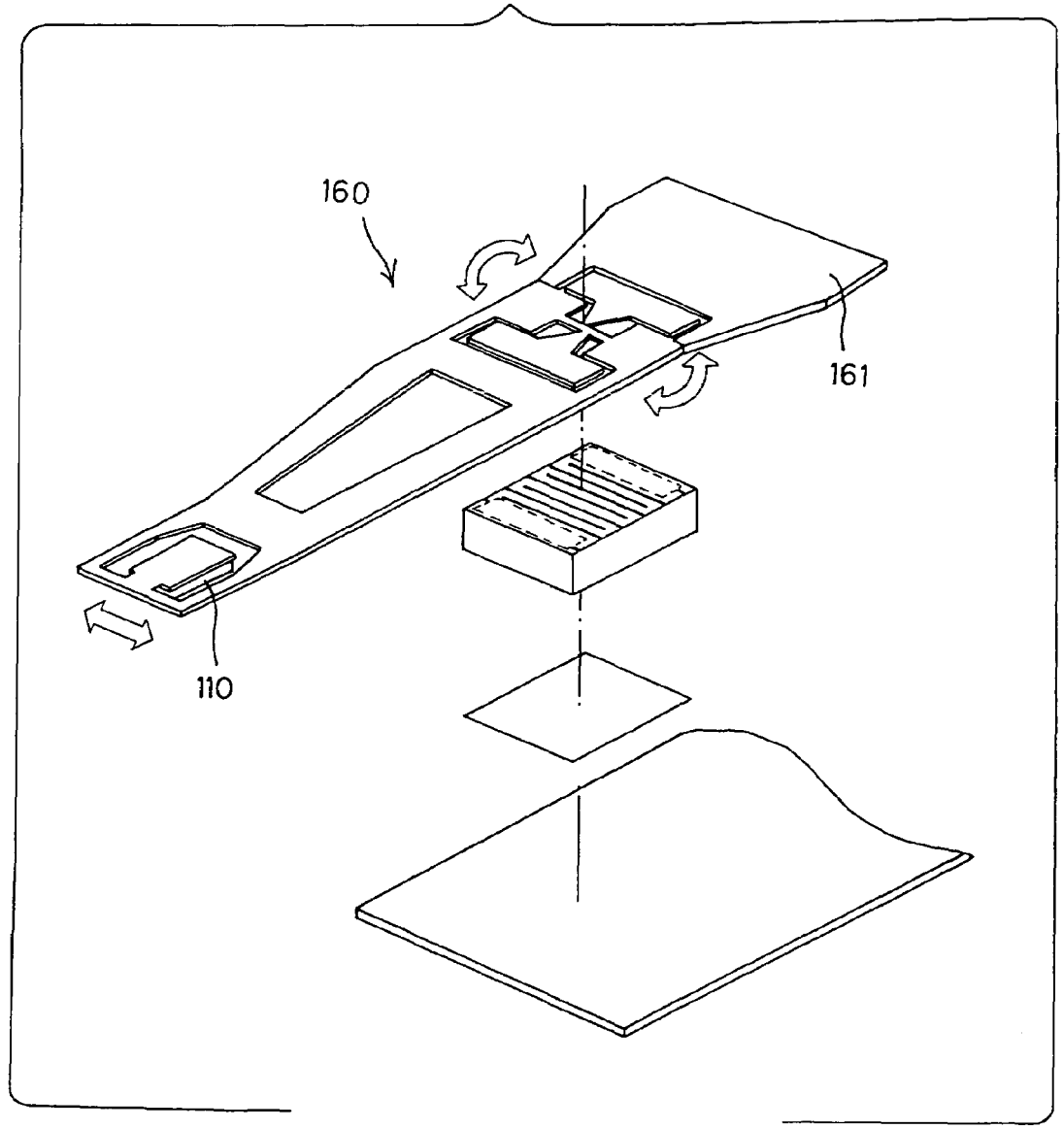
FIG. 14 is an exploded perspective view showing a head actuator and its surroundings in a seventh embodiment of the information storage device according to the present invention.

FIG. 14 is an exploded perspective view showing a head actuator and its surroundings in a seventh embodiment of the information storage device according to the present invention.

The seventh embodiment of the information storage device according to the present invention is the same as the sixth embodiment of the information storage device except that it is equipped with a suspension 160 which has an overhang 161 to maintain balance with the slider 110 and the like.

Since the overhang 161 is balanced with the slider 110 and the like, the seventh embodiment has a low moment of inertia during driving.

Examples will be described below.

In a first example, the same structure as the one shown in FIGS. 2 and 3 was built and its operating characteristics were evaluated.

First, green sheets composed of a PNN-PT-PZ-based piezoelectric ceramic powder and binder resin were prepared by doctor blade casting, and a predetermined electrode pattern was printed on the green sheets using Ag/Pd electrode paste by screen printing. The green sheets on which the predetermined electrode pattern was printed with the electrode paste were laminated, pressurized, degreased in the atmosphere, and baked at 1000° C. to form a ceramic substrate of a laminated structure with a large number of 20-μm thick piezoelectric layers. The ceramic substrate was cut parallel to one direction, surface electrodes were formed on the cut surfaces, and the pieces were cut into discrete elements thereby preparing 1-mm square piezoelectric elements, with the structure shown in FIG. 4.

Also, a 50-μm thick stainless steel plate was blanked on a press to prepare a hinge plate shown in FIG. 5. In this example, the distance h in FIG. 6 is 1.0 mm.

The piezoelectric element and hinge plate thus prepared were bonded to the suspension 108 and slider 110 shown in FIG. 2 in the manner shown in FIG. 2 and wiring was carried out to assemble a complex containing the head section, the head actuator, and part of the arm section according to the present invention.

Operating characteristics of the assembled complex was evaluated with the following results: the resonance frequency was 30 kHz and the head displacement was as large as 1.0 μm at a drive voltage as low as 12 V. In view of the fact that the resonance frequency of typical arm actuators such as the arm actuator 107 shown in FIG. 1 is somewhere around 5 kHz, it was found that the complex is capable of high-speed head movement. Also, whereas the head positioning accuracy of the typical arm actuator 107 is somewhere around 1 μm, this complex can control the head position in a range below 1.0 μm, and thus it was found that this complex can achieve a high positioning accuracy.

Next, a second example will be described. In the second example, operating characteristics were evaluated using the same structure as the one shown in FIG. 11.

First, the same piezoelectric element as in the first example was prepared.

Next, a 50-μm thick stainless steel plate was blanked on a press to prepare a hinge plate shown in FIG. 11.

The piezoelectric element was bonded to one surface of the hinge plate, a slider was bonded to the other surface, and wiring was installed to assemble a complex with a structure shown in FIG. 11. Operating characteristics of the assembled complex was evaluated. The head displacement was as large as 1.0 μm at a drive voltage as low as 12 V as was the case with the first example. The positioning accuracy was as high as 0.05 μm and the resonance frequency was as high as 15 kHz. Thus the complex according to the second example allows high-speed, high-accuracy head positioning.

Next, a third example will be described. In the third example, operating characteristics were evaluated using the same structure as the one shown in FIG. 12.

First, a 2-mm square piezoelectric element and a hinge plate tailored to the size of the piezoelectric element were prepared using the same procedure as the first example.

The piezoelectric element and hinge plate thus prepared were bonded to the suspension 140 and arm section 106 shown in FIG. 12 in the manner shown in FIG. 12 and wiring was carried out to assemble a complex with the structure shown in FIG. 12.

Operating characteristics of the complex was evaluated. The head displacement was as large as 1.0 μm at a very low drive voltage of 3 V. The resonance frequency was 10 kHz, which is sufficiently high.

Finally, a fourth example will be described.

The complex used in the fourth example had the same structure as the complex prepared in the first example except that the slider position was shifted toward the head.

Operating characteristics of the complex was evaluated. The head displacement was as large as 1.5 μm at a drive voltage as low as 12 V. This displacement is larger than in the first example. Although weak sub-resonances were observed in addition to main resonance, the resonance frequency at the main resonance point was as high as 25 kHz.

Incidentally, in the embodiments and examples described above, a hard disk drive has been cited as an example of the information storage device of the present invention, but the information storage device of the present invention may be an optical disk unit or magneto-optical disk unit, provided that the head is moved by being held by an arm.

Also, in the embodiments and examples described above, the hinge plate is either independent of both arm section and head section or integral with only one of the arm section and head section, the hinge plate of the present invention may be integral with both arm section and head section.

As described above, the present invention provides a small, light-weight, impact-resistant, high-accuracy, and low-cost piezoelectric actuator which can achieve a large displacement at a low drive voltage as well as an information storage device with high recording density.

The invention claimed is:

1. A piezoelectric actuator, comprising:
    a hinge plate which has a central portion, two lateral portions, and two limbs, the central portion having both ends and being allowed to be divided between both the ends, the two lateral portions extending point-symmetrically from both ends of the central portion, and the two limbs extending point-symmetrically and non-linear symmetrically from both ends of the central portion such that the central portion is disposed between the two limbs and being capable of rotating toward and away from the lateral portions; and
    a piezoelectric element to which the two limbs of the hinge plate are attached firmly and which brings the two limbs toward and away from each other when it expands or contracts by application and removal of voltage.

2. An information storage device, comprising:
    a head section carrying a head which executes at least one of information recording and information reproduction on/from a predetermined information storage medium;
    an arm section which holds the head section in order for the head mounted on the head section to approach or contact the information storage medium;
    an arm actuator which drives the arm section to move the head mounted on the head section held by the arm section over the information storage medium; and
    a head actuator which rotates the head section with respect to the arm section, wherein
    the head actuator comprising:
    a hinge plate which has a central portion, two lateral portions, and two limbs, the central portion having both ends and being allowed to be divided between both the ends, the two lateral portions extending point-symmetrically from both ends of the central portion, and the two limbs extending point-symmetrically and non-linear symmetrically from both ends of the central portion such that the central portion is disposed between the two limbs and being capable of bending toward and away from the lateral portions; and
    a piezoelectric element to which the two limbs of the hinge plate are attached firmly and which brings the two limbs toward and away from each other when it expands or contracts by application and removal of voltage.

3. The information storage device according to claim 2, wherein the head actuator rotates the head section around the center of gravity of the head section.

4. The information storage device according to claim 2, wherein the hinge plate is formed integrally with the arm section.

5. The information storage device according to claim 2, wherein the hinge plate is formed integrally with the head section.

6. The piezoelectric actuator according to claim 1, wherein the piezoelectric element is based on longitudinal piezoelectric effects (33 mode).

7. The piezoelectric actuator according to claim 1, wherein the piezoelectric element is based on transverse piezoelectric effects (31 mode).

8. The information storage device according to claim 2, wherein the piezoelectric element is based on longitudinal piezoelectric effects (33 mode).

9. The information storage device according to claim 2, wherein the piezoelectric element is based on transverse piezoelectric effects (31 mode).

* * * * *